(12) United States Patent
Grigoryan et al.

(10) Patent No.: US 7,853,157 B2
(45) Date of Patent: Dec. 14, 2010

(54) SYSTEMS AND METHODS FOR THE POLARIZATION INSENSITIVE COHERENT DETECTION AND THE POLARIZATION DIVISION MULTIPLEXED TRANSMISSION OF OPTICAL COMMUNICATION SIGNALS

(75) Inventors: Vladimir S. Grigoryan, Elkridge, MD (US); Michael Y. Frankel, Baltimore, MD (US)

(73) Assignee: Ciena Corporation, Linthicum, MD (US)

( * ) Notice: Subject to any disclaimer, the term of this patent is extended or adjusted under 35 U.S.C. 154(b) by 234 days.

(21) Appl. No.: 12/197,698

(22) Filed: Aug. 25, 2008

(65) Prior Publication Data
US 2009/0169208 A1 Jul. 2, 2009

Related U.S. Application Data

(63) Continuation-in-part of application No. 11/875,622, filed on Oct. 19, 2007.

(51) Int. Cl.
*H04B 10/00* (2006.01)

(52) U.S. Cl. .................. 398/203; 398/212; 398/214; 398/155

(58) Field of Classification Search .............. 398/155, 398/202–214
See application file for complete search history.

(56) References Cited

U.S. PATENT DOCUMENTS

| | | | |
|---|---|---|---|
| 5,351,252 A * | 9/1994 | Toyama et al. | 372/29.021 |
| 5,537,671 A * | 7/1996 | Toyama et al. | 385/27 |
| 6,377,391 B1 * | 4/2002 | Vakoc et al. | 359/337.1 |
| 6,813,447 B2 * | 11/2004 | Ellis et al. | 398/155 |
| 6,853,774 B2 * | 2/2005 | Watanabe | 385/39 |
| 2002/0145795 A1 * | 10/2002 | Vakoc et al. | 359/337.4 |
| 2004/0156572 A1 * | 8/2004 | Richardson et al. | 385/1 |
| 2005/0063425 A1 * | 3/2005 | Krastev et al. | 372/6 |
| 2007/0127932 A1 * | 6/2007 | Qi et al. | 398/188 |
| 2008/0180681 A1 * | 7/2008 | Digonnet | 356/477 |
| 2009/0169208 A1 * | 7/2009 | Grigoryan et al. | 398/65 |

OTHER PUBLICATIONS

S. P. Smith, F. Zarinetchi, and S. Ezekiel: Narrow-linewidth stimulated Brillouin fiber laser and applications; Research Laboratory for Electronics; Massachusetts Institute of Technology; Cambridge, MA 02139; (c) 1991 Optical Society of America.

Jacquest A. Arnaud, Senior Member, IEEE; R-5 Enhancement of Optical Receiver Sensitivies by Amplification of the Carrier; (c) IEEE Journal of Quantum Electronics, vol. QE-4, No. 11, Nov. 1968.

(Continued)

*Primary Examiner*—Agustin Bello
(74) *Attorney, Agent, or Firm*—Clements Bernard PLLC; Christopher L. Bernard; Tyler S. Brown (57) ABSTRACT

The present invention relates generally to the transport and processing of optical communication signals. More specifically, the present invention relates to systems and methods for the polarization insensitive coherent detection of optical communication signals with Brillouin amplification of the associated signal carrier and the polarization division multiplexed transmission of optical communication signals without polarization tracking at the associated receiver(s).

28 Claims, 9 Drawing Sheets

OTHER PUBLICATIONS

K. J. Williams and R.D. Esman; Stimulated Brillouin scattering for improvement of microwave fiber-optic link efficiency; (c) IEEE 1994; Electronics Letters, Nov. 10, 1994, vol. 30, No. 23.

E. Yamada, K. Suzuki and M. Nakazawa; Subpicosecond optical demultiplexing at 10 GHz with zero-dispersion, dispersion-flattened, nonlinear fibre loop mirror controlled by 500fs gain-switched laser dios; (c) IEEE 2000; Electronics Letters, Nov. 10, 1994, vol. 30, No. 23.

S.J. Strutz and K.J. Williams; Low-noise hybrid erbium/Brillouin amplifier; (c) IEEE 2000; Electronics Letters Onlin No. 200001016; DO1: 10.1049/el:200001016.

* cited by examiner

SYSTEMS AND METHODS FOR THE POLARIZATION INSENSITIVE COHERENT DETECTION AND THE POLARIZATION DIVISION MULTIPLEXED TRANSMISSION OF OPTICAL COMMUNICATION SIGNALS

CROSS-REFERENCE TO RELATED APPLICATION(S)

The present patent application is a continuation-in-part of co-pending U.S. patent application Ser. No. 11/875,622 (Vladimir S. Grigoryan and Michael Y. Frankel), filed on Oct. 19, 2007, and entitled "Systems and Methods for the Coherent Non-Differential Detection of Optical Communication Signals," the contents of which are incorporated in full by reference herein.

FIELD OF THE INVENTION

The present invention relates generally to the transport and processing of optical communication signals. More specifically, the present invention relates to systems and methods for the polarization insensitive coherent detection of optical communication signals with Brillouin amplification of the associated signal carrier and the polarization division multiplexed transmission of optical communication signals without polarization tracking at the associated receiver(s).

BACKGROUND OF THE INVENTION

The coherent detection of optical communication signals using the phase shift keying (PSK) modulation format has long been known to offer superior performance relative to direct detection techniques, using conventional direct detection or differential detection modulation formats. First, PSK coherent detection allows higher signal-to-noise ratios (SNRs) to be achieved relative to the direct detection techniques. Second, by preserving and mapping the optical phase of the PSK signal to the electrical domain, PSK coherent detection enables efficient chromatic dispersion (CD) and polarization mode dispersion (PMD) compensation in high speed optical communication systems using low speed adaptive digital filtering. However, building a high performance coherent receiver at reasonable complexity and cost still remains a challenge. One of the critical aspects associated with a coherent receiver is its ability to precisely estimate the relative optical phase and state of polarization between the incoming data signal and the Local Oscillator (LO), and its ability to lock the LO's phase and polarization to the data signal's phase and polarization.

The current state of the art for estimating/locking phase and polarization includes four different techniques. The first technique relies on building phase locked loop (PLL) and polarization tracking functions directly in the analog domain, detecting the phase and polarization difference between the LO laser and the incoming data signal, and stabilizing the LO phase and polarization accordingly. The second technique utilizes an un-stabilized LO and operates in the digital domain by using high speed, real time analog-to-digital conversion (ADC) and digital signal processing (DSP) technology to extract the estimated optical phase and state of polarization in the electrical domain. The third technique also utilizes an un-stabilized LO, and analog signal processing (ASP) in the radio frequency (RF) domain to extract the phase and polarization. The fourth technique utilizes the transmission of a data signal along with a LO pilot tone that is amplified at the receiver.

A major difficulty associated with deploying a coherent detection system is the PLL that locks the phase of the LO field to the phase of the signal carrier field of the optical communication signal. It is desirable to have a noiseless PLL, with zero acquisition time. However, in reality, a compromise must always be struck between the noise bandwidth and the acquisition speed. This contributes to signal degradation on one hand and limits the phase acquisition and tracking speed on the other hand. In addition the current state of the art DSP based approach requires the use of a parallel architecture, as used in high speed ADCs, causing a feedback delay. This necessitates the use of narrow linewidth transmission and local oscillator lasers with sufficiently long coherence times. Therefore, the use of distributed feedback lasers with a linewidth of ~1 MHz becomes problematic in DSP based coherent detection, especially for modulation formats with a dense constellation. Another constraint associated with DSP based coherent detection is the limitation on communication speed due to the fastest ADC and DSP devices that are available. For example, in digital systems, the sampling rate is typically 2× the symbol rate, such that, for symbol rates approaching 40 Gsymbol/s or higher, the required ADC and DSP devices are not yet available. The same problem related to narrow linewidth transmission and local oscillator lasers exists for other coherent detection systems that utilize either analog PLLs directly in the optical domain or phase recovery in the electrical RF domain.

The transmission of a data signal along with an LO pilot tone solves the problem of maintaining a constant phase and frequency relationship between the data signal and the LO, as both originate from the same optical source and traverse the same path. One possibility is to add the LO pilot tone at the transmitter on a polarization that is orthogonal to the data signal. However, in order to achieve practical coherent detection, the LO pilot tone and the data signal must be separated at the receiver, and the LO pilot tone must be amplified. The LO and the data signal are typically separated via one of two mechanisms.

In the first mechanism, the LO and the data signal are separated at the receiver via polarization tracking, and the LO is preferentially amplified. Note that this mechanism is applicable only to systems with an LO pilot tone polarization that is orthogonal to the data signal. Thus, this mechanism precludes the use of polarization multiplexing for signal capacity doubling. Additionally, PMD and polarization dependent gain/loss reduce polarization orthogonality, in general.

In the second mechanism, the LO pilot tone is added to the data signal such that it is sufficiently separated from the data signal spectrum in frequency (i.e. wavelength). As a result, the LO pilot tone can be optically filtered out at the receiver and preferentially amplified. The requirement for such frequency separation, set by the ability of the optical filter(s) to provide selective filtering, reduces the spectral efficiency of WDM systems, however. Furthermore, it requires receiver electronics to operate at a much higher bandwidth, so as to keep the mixing between the LO and the data signal spectra within the receiver electrical bandwidth. In addition, due to the spectral separation of the LO pilot tone and the data signal, the phase of the LO pilot tone relative to the phase of the data signal depends on the CD. As a consequence, the LO-data signal phase difference can vary over time due to fiber temperature induced dispersion variations, etc. Although such relative phase variations are slow compared to the relative phase variations for the external LO scheme, they nevertheless must be tracked by an additional PLL.

A novel technique has been proposed for the coherent detection of optical signals with Brillouin amplification of the associated signal carrier (see Vladimir S. Grigoryan and Michael Y. Frankel, "Systems and Methods for the Coherent Non-Differential Detection of Optical Communication Signals," U.S. patent application Ser. No. 11/875,622, filed Oct. 19, 2007). The major advantage of this technique relative to conventional coherent detection techniques is that it does not require a fast PLL. However, it still requires polarization tracking to align the incoming data signal polarization with one of the axes (i.e. either fast or slow) of the polarization maintaining fiber used, As the propagation distance of an optical communication signal in a fiber network increases, the speed of evolution of the polarization state of the optical communication signal also increases, such that it can sometimes exceed 10's of kiloradians/s for a long haul transmission. Existing polarization tracking devices are not capable of polarization tracking at such high speeds. Thus, the lack of a high speed polarization tracking device becomes a barrier for use of this Brillouin amplification coherent detection technique in long haul fiber networks.

With the continued growth of data traffic over optical networks worldwide, the deployment of new systems with higher capacity per single wavelength is becoming increasingly important. In particular, a 100 Gb/s Ethernet solution is widely considered to be the platform for the next generation of optical networks. Given the severe constraints associated with 100 GHz electronics, optical modulators, and photodiodes on the one hand and high bandwidth optical communication signal impairments due to fiber dispersion and nonlinearity on the other hand, in order for 100 Gb/s Ethernet to become a practical solution, advanced modulation formats are required to reduce the optical bandwidth and symbol rate. Polarization division multiplexing (PDM) is a practical technique used to double channel capacity without increasing channel bandwidth and symbol rate. PDM combined with the quadrature phase shift keying (QPSK) modulation format is widely considered to be one of the most practical solutions for 100 Gb/s Ethernet systems as it allows for the reduction of the symbol rate to 28 Gbaud/s (25 Gbaud/s for the payload, and an additional 3 Gbaud/s for the framing overhead). However, an inherent drawback of PDM is that it requires a polarization tracking device at the receiver to align the incoming signal polarization to a polarization beam splitter to demultiplex the signal. The state of polarization of an optical communication signal traversed through a fiber undergoes random evolutions over time because of the unpredictable drift of the fiber polarization axes.

There are three techniques used in state of the art polarization tracking devices. The first technique, analog polarization tracking, uses a polarization controller based on a sequence of several electro-optical crystal wave plates with processor controllable voltages applied to them, resulting in controllable retardation and orientation angles in each of the wave plates. The associated polarization tracking error is up to 0.13 radians on the Poincaré sphere with the tracking speed not faster than several kiloradians/s. The second technique is based on coherent detection. It uses a polarization diversity receiver, an unstabilized LO, and operates in the digital domain by means of a high speed real time ADC and DSP technology to extract the estimated state of polarization and phase in the electrical domain. The third technique also uses a polarization diversity receiver and unstabilized LO, but implements an analog processing in the RI domain to extract the polarization and phase.

As the propagation distance of an optical communication signal in a fiber network increases, the speed of evolution of the signal state of polarization increases such that it can, sometimes, exceed 10's of kiloradians/s for a long haul transmission. In addition, the speed of evolution of the signal state of polarization can exceed 10's of kiloradians/s even if the drift of the polarization axes in the fiber is slow but distributed high speed polarization scramblers are used. Such distributed high speed polarization scrambling is widely considered to be an efficient and the most economic technique for mitigating PMD. Existing analog polarization tracking devices are not capable of polarization tracking at such speeds. In addition, the 0.13 radians of polarization tracking error in state of the art analog polarization tracking devices can result in significant penalties due to the crosstalk of the polarization channels. State of the art DSP based polarization tracking techniques rely on coherent detection schemes with an external LO. Again, a major difficulty associated with deploying a coherent detection system is the PLL that locks the phase of the LO field to the phase of the signal carrier field of the optical communication signal. It is desirable to have a noiseless PLL, with zero acquisition time. However, in reality, a compromise must always be struck between the noise bandwidth and the acquisition speed. This contributes to signal degradation on one hand and limits the phase acquisition and tracking speed on the other hand. In addition the current state of the art DSP based approach requires the use of a parallel architecture, as used in high speed ADCs, causing a feedback delay. This necessitates the use of narrow linewidth transmission and local oscillator lasers with sufficiently long coherence times. Therefore, the use of distributed feedback lasers with a linewidth of ~1 MHz becomes problematic in DSP based coherent detection. Another constraint associated with DSP based coherent detection is the limitation on communication speed due to the fastest ADC and DSP devices that are available. For example, in digital systems, the sampling rate is typically 2× the symbol rate, such that, for symbol rates approaching 40 Gsymbol/s or higher, the required ADC and DSP devices are not yet available.

Thus, high speed and accuracy analog polarization tracking becomes a barrier in using a PDM technique in a modern fiber communication system. One consequence is the inability to use distributed polarization scrambling technology for PMD mitigation in PDM systems, which results in higher vulnerability and lower tolerance of the PDM systems as it relates to PMD.

BRIEF SUMMARY OF THE INVENTION

In various exemplary embodiments, the present invention provides a novel technique for the coherent detection of optical communication signals at arbitrary states of polarization assisted by the Brillouin amplification of the signal carrier. A major advantage of this technique relative to earlier proposed techniques for the coherent detection of optical communication signals assisted by the Brillouin amplification of the signal carrier is that it is insensitive to the state of polarization of the incoming signal. Therefore, it enables operation without use of polarization tracking devices. At the same time, it has all of the advantages of the earlier proposed techniques, such as: 1) it does not require an external laser source as a LO; 2) it utilizes the Brillouin amplifier's intrinsic narrow band property (i.e. a few MHz) to provide optical filtering far tighter than that available with any passive optical filters; 3) it provides near ideal synchronization of the optical phase and frequency between the LO and data signal, as both come from the same optical source and traverse near identical optical paths; and 4) it inherently yields a LO in the same state of polarization as that of the data signal. In general, the LO is extracted from the signal using Brillouin fiber amplification (BFA) of the signal carrier frequency component in order to create a Virtual Local Oscillator (VLO).

In one exemplary embodiment of the present invention, a system for the Brillouin fiber amplification based polarization insensitive coherent (homodyne) detection of a phase shift keying optical communication signal includes: a Sagnac loop including one of a single mode fiber span and a spun fiber span; a Brillouin pump coupled to the Sagnac loop; wherein the Sagnac loop and the Brillouin pump are collectively operable for amplifying a carrier component of the phase shift keying optical communication signal and separating the amplified carrier component of the phase shift keying optical communication signal from a baseband of the phase shift keying optical communication signal; and a phase shift keying hybrid coupled to the Sagnac loop and the Brillouin pump; wherein the Sagnac loop, the Brillouin pump, and the phase shift keying hybrid are collectively operable for extracting a local oscillator from the phase shift keying optical communication signal via the amplified carrier component of the phase shift keying optical communication signal to create a virtual local oscillator, and wherein the system is insensitive to the state of polarization of the phase shift keying optical communication signal. The Sagnac loop further includes a variable optical attenuator operable for selectively attenuating the effect of the Brillouin pump on the phase shift keying optical communication signal. When the Sagnac loop includes the single mode fiber span, the Sagnac loop further includes a polarization controller. The Sagnac loop is coupled to the Brillouin pump and the phase shift keying hybrid by one or more circulators. The system also includes a narrow band optical filter operable for attenuating the effect of the Brillouin pump disposed between the Sagnac loop and the phase shift keying hybrid. The system further includes an optical amplifier operable for amplifying the phase shift keying optical communication signal disposed between the Sagnac loop and the phase shift keying hybrid. The system still further includes a phase shift keying detector coupled to the phase shift keying hybrid.

In another exemplary embodiment of the present invention, a method for the Brillouin fiber amplification based polarization insensitive coherent (homodyne) detection of a phase shift keying optical communication signal includes: providing a Sagnac loop including one of a single mode fiber span and a spun fiber span; providing a Brillouin pump coupled to the Sagnac loop; wherein the Sagnac loop and the Brillouin pump are collectively operable for amplifying a carrier component of the phase shift keying optical communication signal and separating the amplified carrier component of the phase shift keying optical communication signal from a baseband of the phase shift keying optical communication signal; and providing a phase shift keying hybrid coupled to the Sagnac loop and the Brillouin pump; wherein the Sagnac loop, the Brillouin pump, and the phase shift keying hybrid are collectively operable for extracting a local oscillator from the phase shift keying optical communication signal via the amplified carrier component of the phase shift keying optical communication signal to create a virtual local oscillator, and wherein the system is insensitive to the state of polarization of the phase shift keying optical communication signal. The Sagnac loop further includes a variable optical attenuator operable for selectively attenuating the effect of the Brillouin pump on the phase shift keying optical communication signal. When the Sagnac loop includes the single mode fiber span, the Sagnac loop fiber includes a polarization controller. The Sagnac loop is coupled to the Brillouin pump and the phase shift keying hybrid by one or more circulators. The method also includes providing a narrow band optical filter operable for attenuating the effect of the Brillouin pump disposed between the Sagnac loop and the phase shift keying hybrid. The method further includes providing an optical amplifier operable for amplifying the phase shift keying optical communication signal disposed between the Sagnac loop and the phase shift keying hybrid. The method still further includes providing a phase shift keying detector coupled to the phase shift keying hybrid.

In various exemplary embodiments, the present invention also provides a novel technique for the polarization demultiplexing of PDM signals in fiber communication networks without the use of polarization tracking devices. This technique is based on two key elements. The first key element is a transmitter that enables a slight separation of the carrier frequencies for two orthogonal polarization channels at the transmitter. The second key element is a Brillouin amplifier for amplifying the signal carrier at the receiver. The QPSK modulation format is utilized, for example.

In a further exemplary embodiment of the present invention, a fiber communication system incorporating a polarization demultiplexing receiver that does not require the use of a polarization tracking device at the polarization demultiplexing receiver includes: a transmitter; and a receiver component associated with a first polarization channel including: a Sagnac loop including one of a single mode fiber span and a spun fiber; a Brillouin pump coupled to the Sagnac loop; wherein the Sagnac loop and the Brillouin pump are collectively operable for amplifying a carrier component of an optical communication signal on one of the polarizations and separating the amplified carrier component of the optical communication signal from a baseband of the optical communication signal; and a hybrid coupled to the Sagnac loop and the Brillouin pump; wherein the Sagnac loop, the Brillouin pump, and the hybrid are collectively operable for extracting a local oscillator from the optical communication signal on one of the polarizations via the amplified carrier component of the optical communication signal to create a virtual local oscillator. Preferably, the transmitter is a carrier split polarization multiplexing transmitter. The transmitter also includes one or more laser sources. Optionally, the transmitter further includes an acousto-optic frequency shifter. The transmitter still further includes a plurality of modulators. The transmitter still further includes a polarization combiner. Optionally, the Sagnac loop also includes a variable optical attenuator operable for selectively attenuating the effect of the Brillouin pump on the optical communication signal. When the Sagnac loop includes the single mode fiber span, the Sagnac loop further includes a polarization controller. The Sagnac loop is coupled to the Brillouin pump and the hybrid by one or more circulators. Optionally, the receiver component associated with the first polarization channel also includes a narrow band optical filter operable for attenuating the effect of the Brillouin pump disposed between the Sagnac loop and the hybrid. Optionally, the receiver component associated with the first polarization channel further includes an optical amplifier operable for amplifying the optical communication signal disposed between the Sagnac loop and the hybrid. Optionally, the system also includes a receiver component associated with a second polarization channel that is substantially similar to the receiver component associated with the first polarization channel. Alternatively, the system includes a receiver component associated with a second polarization channel that includes a polarization rotator and a hybrid. Preferably, the system utilizes one of a homodyne detection scheme and a heterodyne detection scheme.

BRIEF DESCRIPTION OF THE DRAWINGS

The present invention is illustrated and described herein with reference to the various drawings, in which like reference number are used to denote like system components and/or method steps, as appropriate, and in which.

DETAILED DESCRIPTION OF THE INVENTION

In various exemplary embodiments, the present invention provides a novel technique for the coherent detection of optical communication signals at arbitrary states of polarization assisted by the Brillouin amplification of the signal carrier. A major advantage of this technique relative to earlier proposed techniques for the coherent detection of optical communication signals assisted by the Brillouin amplification of the signal carrier is that it is insensitive to the state of polarization of the incoming signal. Therefore, it enables operation without use of polarization tracking devices. At the same time, it has all of the advantages of the earlier proposed techniques, such as: 1) it does not require an external laser source as a LO; 2) it utilizes the Brillouin amplifier's intrinsic narrow band property (i.e. a few MHz) to provide filtering far tighter than that available with any passive optical filters; 3) it provides near ideal synchronization of the optical phase and frequency between the LO and data signal, as both come from the same optical source and traverse near identical optical paths; and 4) it inherently yields a LO in the same state of polarization as that of the data signal. In general, the LO is extracted from the signal using BFA of the signal carrier frequency component in order to create a VLO.

Figure 1:
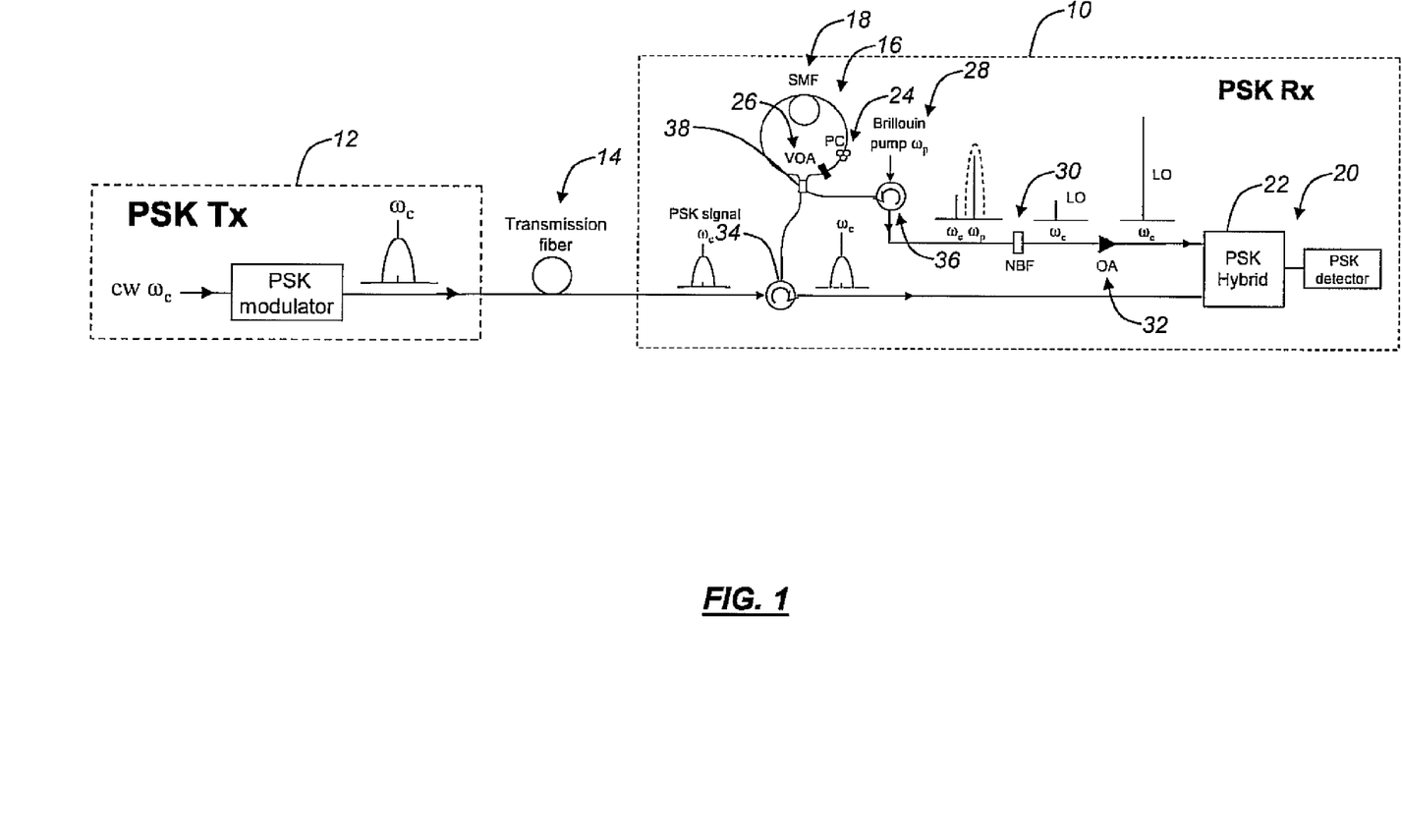
FIG. 1 is a schematic diagram illustrating one exemplary embodiment of a system for the BFA based polarization insensitive coherent (homodyne) detection of an optical PSK signal, i.e. a PSK Rx, in accordance with the present invention.

FIG. 1 is a schematic diagram illustrating one exemplary embodiment of a system for the BFA based polarization insensitive coherent (homodyne) detection of an optical PSK signal, i.e. a PSK Rx 10, in accordance with the present invention. It should be noted that the PSK Tx 12 and transmission fiber 14 over which the PSK signal is transmitted are illustrated only for the sake of completeness. The PSK Rx 10 includes two major components: 1) a Sagnac loop mirror 16 including a single mode fiber (SMF) span 18 and 2) a receiver 20 based on a PSK hybrid 22. The Sagnac loop mirror 16 also includes a polarization controller (PC) 24 and a variable optical attenuator (VOA) 26, while the PSK Rx 10 also includes a Brillouin pump 28, a narrow band optical filter (NBF) 30, and optical amplifier (OA) 32. The Sagnac loop mirror 16 simultaneously serves two purposes. First, it provides amplification of the carrier via a counter propagating pump. Second, it allows for separation of the amplified carrier from the baseband of the signal. An arbitrary polarized PSK signal with a carrier frequency, $\omega_c$, enters the Sagnac loop 16 through its left port and a first circulator 34. The continuous wave (CW) pump 28 at a frequency, $\omega_p$, is launched into the Sagnac loop 16 through its right port and a second circulator 36. The pump frequency is chosen such that it matches the Brillouin resonance condition, i.e. $\omega_p - \omega_c = \Omega$, where $\Omega$ is the Brillouin scattering shift (in optical fibers, $\Omega \sim 2\pi \times 10$ GHz). In \ the Sagnac loop 16, the carrier frequency is preferentially amplified in the direction counter-propagating to the injected BFA pump wave. Because the BFA occurs only within a very narrow bandwidth, on the order of few MHz, much smaller than the signal bandwidth, the signal baseband remains practically unaffected by the BFA in both directions. As a result, the signal is reflected back by the Sagnac loop mirror 16 to the same left port through which it entered. On the other hand, the carrier propagating in the counterclockwise direction in the Sagnac loop 16 is amplified. The BFA gain in the counterclockwise propagation direction is significantly higher than the BFA gain in the clockwise propagation direction. This is because of pump attenuation by the VOA 26. As the VOA 26 is located in the right part of the Sagnac loop 16, close to the loop coupler 38, it attenuates the pump entering the loop in the counterclockwise direction, before the pump enters the SMF spool 18. As a result, the attenuated pump provides a much smaller BFA gain to the carrier traveling in the opposite (clockwise) direction. At the same time, the pump entering the Sagnac loop 16 in the clockwise direction experiences no attenuation before it reaches the SMF spool 18. Therefore, it provides a significantly higher BFA gain to the carrier propagating in the counterclockwise direction. As a result, the power of the carrier exiting the Sagnac loop 16 through its left and right ports splits about equally between the two ports. As for the pump wave, it reflects back by the Sagnac loop mirror 16 and exits the Sagnac loop 16 through the right port. Only a small portion of the pump can exit the Sagnac loop 16 with the signal baseband through the left port due to a small differential pump depletion of the pump waves traveling in the clockwise and counterclockwise propagation directions. However, this small portion of the pump exiting with the signal baseband through the left port can be reduced to zero by adjusting the laser pump power and the VOA loss. Thus, the signal (affected only by the loss in the VOA 26) and a part of the carrier with no pump exit the Sagnac loop 16 through the left port and are directed to the PSK hybrid 22 by the first circulator 34. Whereas only another part of the carrier and the pump exit the loop through the right port. After cutting off the pump using the NBF 30 the carrier is amplified by the OA 32 and sent to the PSK hybrid 22. In the PSK hybrid 22, the amplified carrier component of the PSK signal operates as a VLO, which is automatically set in-phase to (and in the same polarization with) the PSK signal, to enable the homodyne detection. Note that because of a slow drift of the polarization axes in a typical SMF, the extinction ratio of the Sagnac loop mirror 16 varies over time. The PC 24 is used to adjust the time (i.e. environmental) variations of the reflectivity of the Sagnac loop mirror 16.

Figure 2:
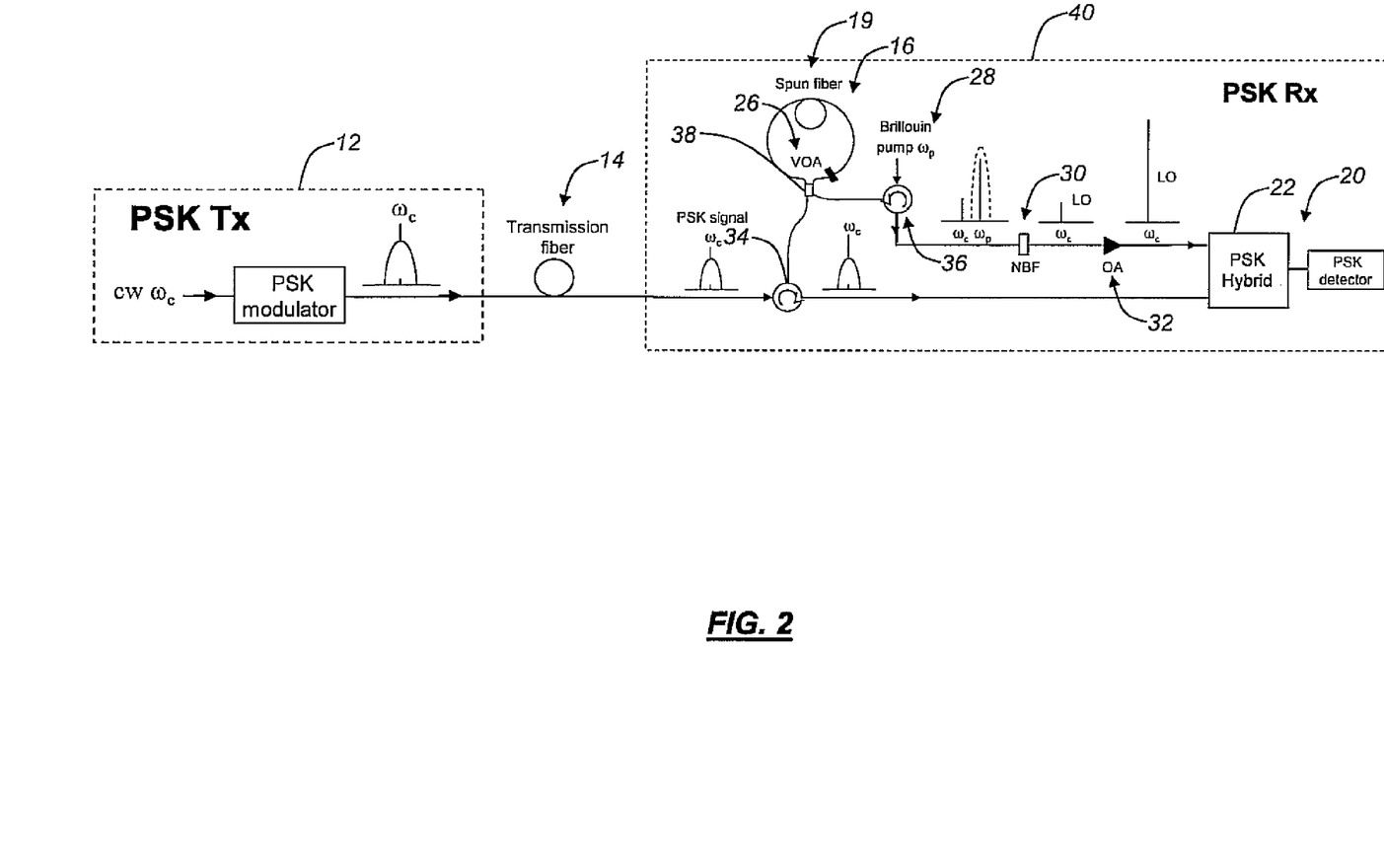
FIG. 2 is a schematic diagram illustrating another exemplary embodiment of a system for the BFA based polarization insensitive coherent (homodyne) detection of an optical PSK signal, i.e. a PSK Rx, in accordance with the present invention.

FIG. 2 is a schematic diagram illustrating another exemplary embodiment of a system for the BFA based polarization insensitive coherent (homodyne) detection of an optical PSK signal, i.e. a PSK Rx 40, in accordance with the present invention. Again, it should be noted that the PSK Tx 12 and transmission fiber 14 over which the PSK signal is transmitted are illustrated only for the sake of completeness. In this embodiment, a spun fiber 19 is used instead of the standard SMF 18 (FIG. 1) used previously. Practically, the spun fiber 19 operates as a fully isotropic fiber in which the state of polarization does not vary over distance, such that the state of polarization at the output of the spun fiber 19 remains identical to the input state of polarization. In this case, there is no time (i.e. environmental) variation of the reflectivity of the Sagnac loop mirror 16 and, consequently, the PC 24 (FIG. 1) is not required to adjust for this variation.

It should be noted that some form of data line coding is required for this scheme, as the signal content must still be separable from the LO by at least the width of the Brillouin amplifier gain linewidth. This is on the order of a few MHz. Such data line coding is well known to those of ordinary skill in the art, and is used extensively, for example, in telephone systems to avoid severe electrical attenuation below 300 Hz.

A major advantage of the Brillouin amplification based polarization insensitive coherent detection technique of the present invention is that it is insensitive to the state of polarization of the incoming signal. Therefore, this technique enables operation without the use of polarization tracking devices. At the same time, the technique does not require an external laser source as a LO, it utilizes the Brillouin amplifier's intrinsic narrow band property (i.e. a few MHz) to provide filtering far tighter than that available with any passive optical filters, it provides near ideal synchronization of the optical phase and frequency between the LO and data signal, as both come from the same optical source and traverse near identical optical paths, and it inherently yields a LO in the same state of polarization as that of the data signal.

These advantages can be optimized for a significant enhancement in the performance and efficiency of both analog and digital coherent optical communication systems. In particular, the present invention enables homodyne detection with no external LO for optical signals, first, in long haul fiber networks with the state of polarization varying over time with arbitrary speed and, second, in fiber links with distributed high speed polarization scramblers used to mitigate the PMD. In addition, by transferring the optical phase of the PSK signal to the electrical domain, the Brillouin amplification based coherent detection technique enables efficient CD and PMD compensation in high speed fiber communication systems using low speed adaptive digital filtering.

The Brillouin amplification based polarization insensitive coherent detection technique of the present invention finds particular applicability in 40 Gb/s and 100 Gb/s optical communication systems, such as 40 Gb/s binary and quadrature phase shift keying (DPSK and QPSK) and 100 Gb/s DPSK and QPSK optical communication systems, for example. This technique allows electronic dispersion compensation to be used to combat both CD and PMD. This is preferable to the use of less economical optical CD and PMD compensators.

In various exemplary embodiments, the present invention also provides a novel technique for the polarization demultiplexing of PDM signals in fiber communication networks without use of polarization tracking devices. This technique is based on two key elements. The first key element is a transmitter that enables a slight separation of the carrier frequencies for two orthogonal polarization channels at the transmitter. The second key element is a Brillouin amplifier for amplifying the signal carrier at the receiver. The QPSK modulation format is utilized, for example.

Figure 3:
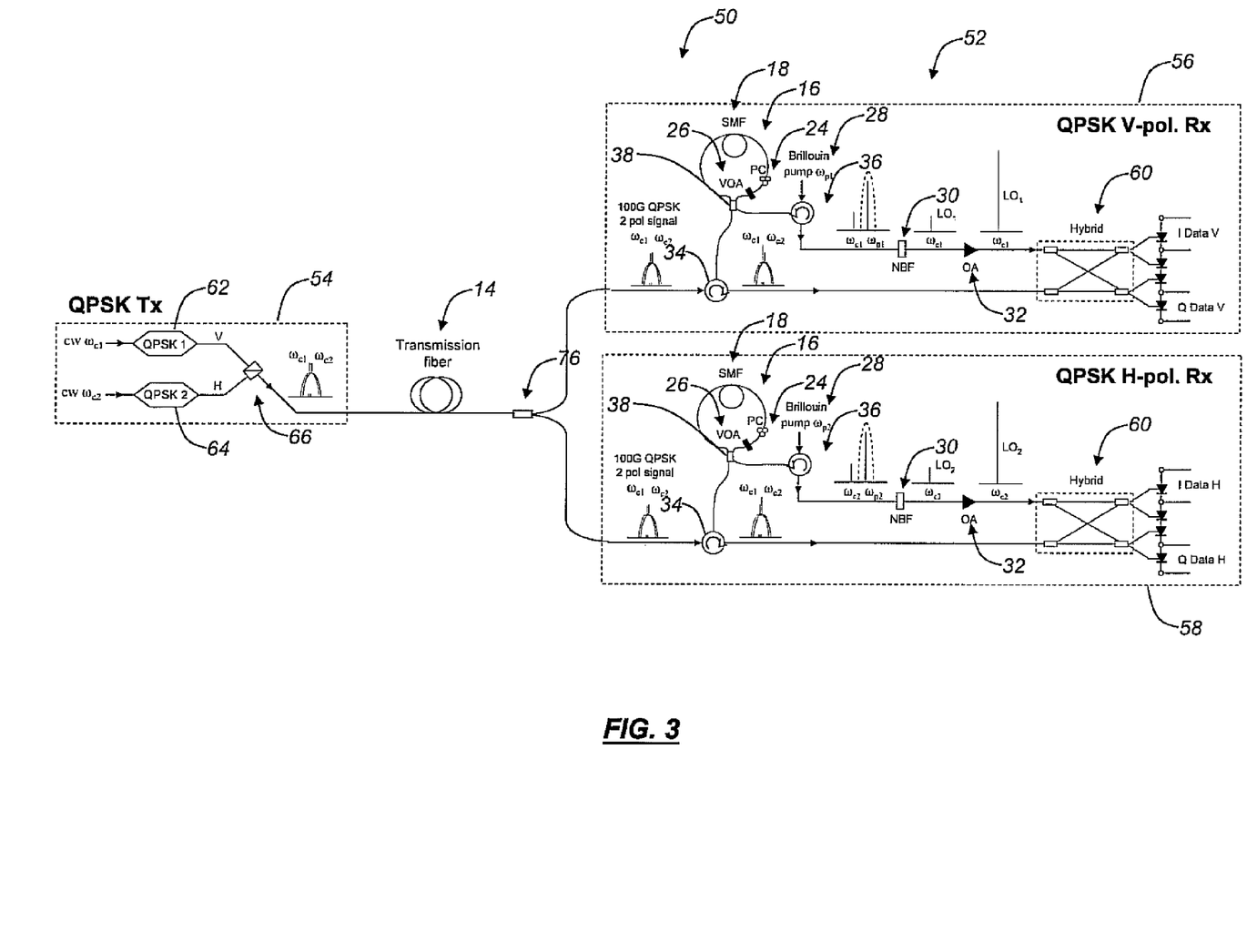
FIG. 3 is a schematic diagram illustrating one exemplary embodiment of a PDM QPSK fiber communication system that uses a polarization demultiplexing receiver based on one or more SMF spans and that does not use polarization tracking devices at the receiver.

FIG. 3 is a schematic diagram illustrating one exemplary embodiment of a PDM QPSK fiber communication system 50 that uses a polarization demultiplexing receiver 52 based on one or more SMF spans 18 and that does not use polarization tracking devices at the receiver 52. The system 50 uses a QPSK Tx 54, a QPSK V-pol.Rx 56, and a QPSK H-pol.Rx 58, for the vertical and horizontal polarizations, respectively. $\omega_{c1}$, and $\omega_{c2}$ are the carrier frequencies for the two orthogonally polarized channels, respectively. As above, the system includes a PC 24 and a VOA associated with each receiver component, as well as a NBF 30 and an OA 32. $LO_1$ and $LO_2$ are the LOs created by extracting the $\omega_{c1}$ and $\omega_{c2}$ carrier frequencies for the two orthogonally polarized channels, respectively, and $\omega_{p1}$ and $\omega_{p2}$ are the pump frequencies set in Brillouin resonance with the $\omega_{c1}$ and $\omega_{c2}$ carrier frequencies, respectively. I Data and Q Data are the in-phase and quadrature data, respectively.

At the transmitter side, carrier split polarization multiplexing (CSPM) is used. Two continuous waves (CWs) at the closely spaced angular frequencies $\omega_{c1}$ and $\omega_{c2}$, separated by $\sim 2\pi \times 100$ MHz, are sent to QPSK modulators 62 and 64 followed by a polarization combiner 66 to create a PDM QPSK signal. The angular frequency separation of $\sim 100$ MHz between the carriers is chosen such that it is much larger than the Brillouin amplification linewidth of $\sim 10$ MHz, but much smaller than the signal bandwidth. Unlike a conventional sub-carrier approach to PDM, in which the spectral efficiency is reduced as compared to a single carrier approach because of the significant sub-carrier frequency separation, being close to the signal bandwidth, the carrier splitting of $\sim 100$ MHz is two orders of magnitude smaller than the signal bandwidth. As a consequence, spectral efficiency does not suffer. It practically remains the same as in the single carrier PDM. In the transmitter 54, the two waves at frequencies $\omega_{c1}$ and $\omega_{c2}$ can be coming either from two separate stable laser sources or from the same laser combined with a frequency shifter. For practical purposes, it is desirable to have only one laser source and a stable frequency shifter to avoid relative drift between the $\omega_{c1}$ and $\omega_{c2}$ frequencies.

Figure 4:
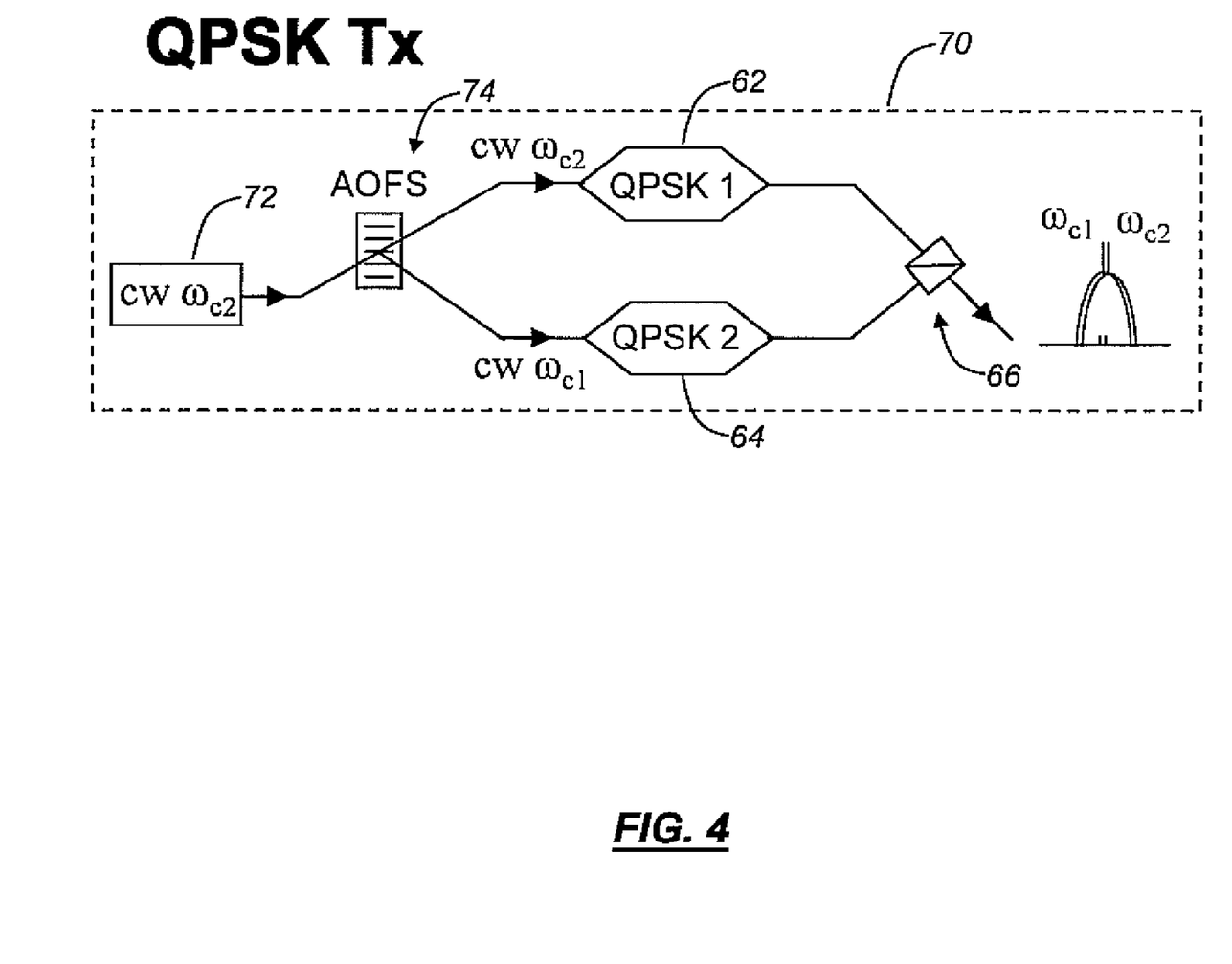
FIG. 4 is a schematic diagram illustrating one exemplary embodiment of a carrier split polarization multiplexing (CSPM) transmitter with only one laser source that can be used in conjunction with the system of FIG. 3.

An exemplary embodiment of the CSPM transmitter 70 with only one laser source 72 is illustrated in FIG. 4. The cw laser 72 at $\omega_{c2}$ angular carrier frequency is represented by cw $\omega_{c2}$ AOFS 74 is the acousto-optic frequency shifter. Again, QPSK 1 62 and QPSK 2 64 are the QPSK modulators for polarization channels 1 and 2, respectively. The cw laser 72 at $\omega_{c2}$ carrier frequency is sent to the AOFS 74, which generates a wave at $\omega_{c1}$ frequency down shifted from $\omega_{c2}$ by the acoustic wave frequency. Such angular frequency shift can be set to a targeted 100 MHz, for example, and accurately controlled by a stable RF source that feeds the AOFS 74. Thus, at the output of the AOFS 74, two waves are present, a frequency shifted wave at $\omega_{c1}$ and the original wave at $\omega_{c2}$ frequencies. The two cws at frequencies $\omega_{c1}$ and $\omega_{c2}$ are then sent to the QPSK modulators 62 and 64 followed by a polarization combiner 66 to create the PDM QPSK signal.

Referring again to FIG. 3, because the CSPM QPSK signal exiting the fiber link includes two carriers for two polarization channels separated by more than the Brillouin linewidth (of ~10 MHz), it can be polarization demultiplexed using a BFA. The CSPM QPSK signal is first split by a 3 dB coupler 76 or the like at the output of the transmission fiber 14. Again, FIG. 3 is a schematic diagram illustrating one exemplary embodiment of the BFA based polarization demultiplexing coherent (homodyne) detection of an optical QPSK signal (via QPSK Rx 52). The BFA based polarization demultiplexed coherent receiver setup includes two major blocks, one for the vertically polarized channel (i.e. QPSK V-pol. Rx 56) and the one for the horizontally polarized channel (i.e. QPSK H-pol. Rx 58). Each of these two blocks, in turn, includes two major elements, a Sagnac loop mirror 16 with a SMF span 18 and a QPSK hybrid receiver 60. The Sagnac loop mirror 16 in this setup serves two purposes simultaneously. First, it provides amplification of the signal carrier via a counter propagating pump 28. Second, it allows for the separation of the amplified signal carrier from the baseband of the signal. An arbitrary polarized QPSK signal enters the Sagnac loop 16 through its left port and the first circulator 34. The cw pump 28 is launched into the Sagnac loop 16 through its right port and the second circulator 36. In each block, the pump frequency is chosen such that it matches the Brillouin resonance condition for the $\omega_{c1}$ and $\omega_{c2}$ carrier frequencies, respectively. That is $\omega_{p1}-\omega_{c1}=\Omega$ in the QPSK V-pol. Rx block 56 and $\omega_{p2}-\omega_{c2}=\Omega$ in the QPSK H-pol. Rx block 58, respectively, where CA is the Brillouin scattering shift (in optical fibers, $\Omega \sim 2\pi \times 10$ GHz). In the QPSK V-pol. Rx block 56, in each direction in the Sagnac loop 16, the carrier frequency $\omega_{c1}$ is amplified because of the BFA with the counter propagating pump wave. Because the BFA occurs only within a very narrow bandwidth, on the order of a few MHz, much smaller than the signal bandwidth, the signal baseband remains practically unaffected by the BFA. As a consequence, the signal is reflected back by the Sagnac loop mirror 16 to the same left port of the Sagnac loop 16 through which it entered. On the other hand, the signal carrier propagating in the clockwise and counterclockwise directions in the loop is amplified. However, the BFA gain in the counterclockwise propagation direction is significantly higher than the BFA gain in the clockwise propagation direction. This is due to pump attenuation by the VOA 26. Because the VOA 26 is located in the right part of the Sagnac loop 16, close to the loop coupler 38, it attenuates the pump 28 entering the Sagnac loop 16 in the counterclockwise direction before the pump 28 enters the SMF span 18. As a consequence, the attenuated pump 28 provides a much smaller BFA gain to the signal carrier traveling in the opposite (clockwise) direction. At the same time, the pump 28 entering the Sagnac loop 16 in the clockwise direction sees no attenuation before it reaches the SMF span 18. Therefore, it provides a significantly higher BFA gain to the signal carrier propagating in the counterclockwise direction. As a result, the power of the carrier $\omega_{c1}$ exiting the Sagnac loop 16 in the QPSK V-pol. Rx block 56 through its left and right ports splits about equally between the two ports. As for the pump wave at the $\omega_{p1}$ frequency, it reflects back by the Sagnac loop mirror 16 and exits the Sagnac loop 16 through the right port. Only a small portion of the pump 28 may exit the Sagnac loop 16 with the signal baseband through the left port of the Sagnac loop 16 due to a small differential pump depletion of the pump waves traveling in the clockwise and counterclockwise propagation directions. However, this small portion of the pump 28 exiting the Sagnac loop 16 with the signal baseband through the left port of the Sagnac loop 16 can be reduced to zero by adjusting the laser pump power and the VOA loss. Thus, the signal (affected only by the loss in the VOA 26) and a part of the signal carrier with no pump 28 exit the Sagnac loop 16 through the left port and are directed to the QPSK hybrid 60 by the first circulator 34. Whereas only another part of the signal carrier and the pump 28 exit the Sagnac loop 16 through the right port. After cutting off the pump 28 using the NBF 30, the signal carrier is amplified by the OA 32 and is sent to the QPSK hybrid 60. In the QPSK hybrid 60, the amplified signal carrier component of the QPSK signal at the $\omega_{c1}$ carrier frequency operates as the VLO, which is automatically set in phase to (and in the same polarization with) the vertically polarized QPSK channel to enable the homodyne detection. Although the other polarization channel at the $\omega_{c2}$ carrier frequency co-propagates with the polarization channel $\omega_{c1}$ carrier frequency, the impact of the former is cancelled out in the balanced detector of the QPSK hybrid in the QPSK V-pol. Rx block 56 because of the orthogonality of the polarizations. The operation of the QPSK H-pol. Rx block 58 is substantially similar to the operation of the QPSK V-pol. Rx block 56, in which case the sub-index "1" is substituted by the sub-index "2". Note that, because of a slow drift of the polarization axes in a typical SMF, the extinction ratio of the Sagnac loop mirror reflection varies over time. The PC 24 is used to adjust the time (i.e. the environmental) variations of the reflectivity of the Sagnac loop mirror 16.

Figure 5:
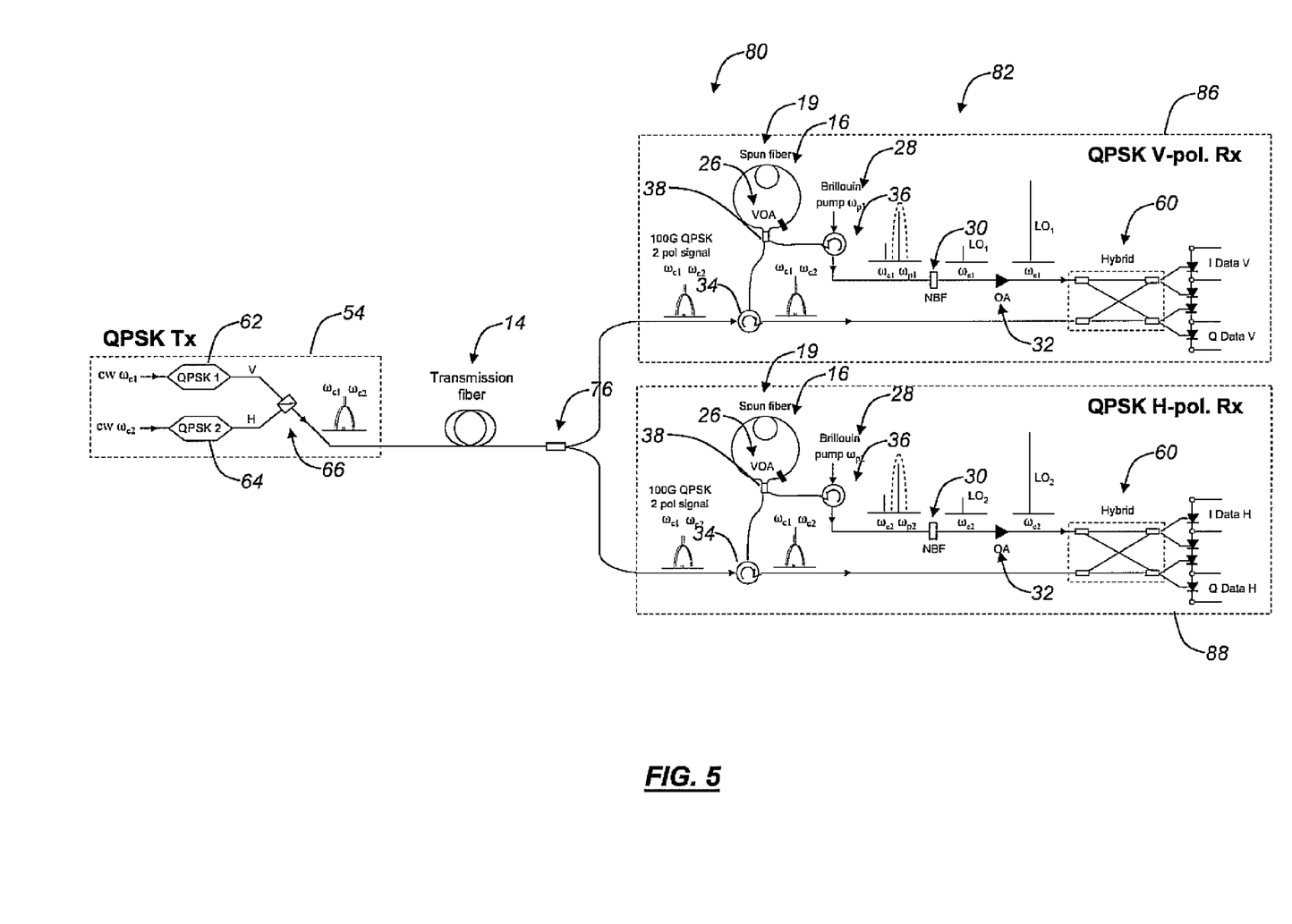
FIG. 5 is a schematic diagram illustrating one exemplary embodiment of a PDM QPSK fiber communication system that uses a polarization demultiplexing receiver based on one or more spun fiber spans and that does not use polarization tracking devices at the receiver.

Another exemplary embodiment of BFA based polarization demultiplexing coherent (homodyne) receiver 82 is illustrated in FIG. 5. In this exemplary embodiment, a spun fiber 19 is used instead of the SMF span 18 used in the exemplary embodiment of FIG. 3. The spun fiber 19 practically operates as a fully isotropic fiber, in which the state of polarization does not vary over distance, such that the state of polarization at the output of the spun fiber 19 remains identical to the input state of polarization. Thus, there is no time (i.e. environmental) variation of the reflectivity of the Sagnac loop mirror reflectivity and, consequently, the PC 26 (FIG. 3) is not needed in the Sagnac loop 16 to adjust the time (i.e. environmental) loop reflectivity variations. The principle of operation of the polarization demultiplexing coherent (homodyne) receiver 82 illustrated in FIG. 5 and functionality of all of its elements remain substantially similar to the exemplary embodiment of FIG. 3.

Figure 6:
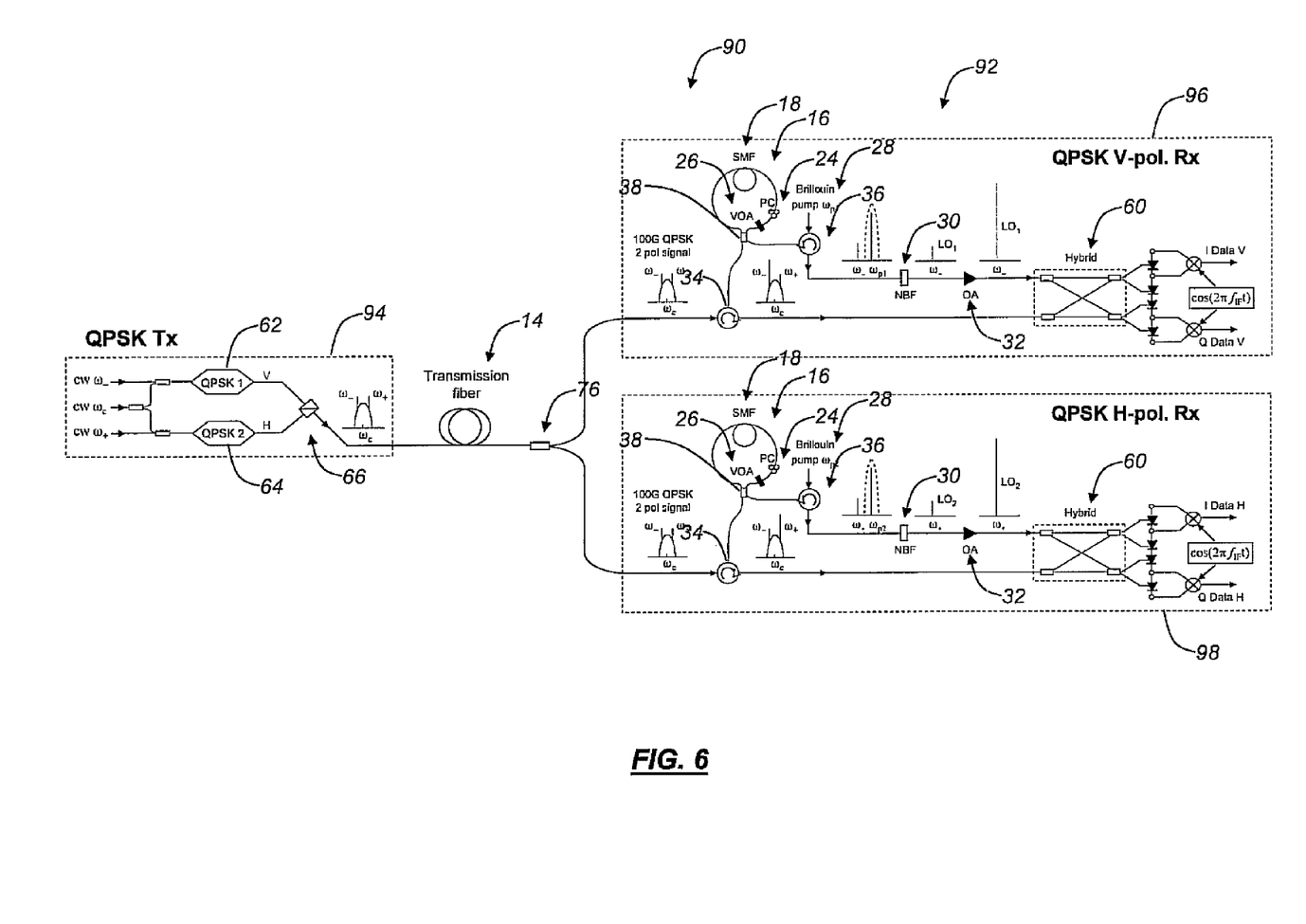
FIG. 6 is a schematic diagram illustrating another exemplary embodiment of a PDM QPSK fiber communication system that uses a polarization demultiplexing receiver based on one or more SMF spans and that does not use polarization tracking devices at the receiver.

FIG. 6 is a schematic diagram illustrating another exemplary embodiment of a PDM QPSK fiber communication system 90 that uses a polarization demultiplexing receiver 92 based on one or more SMF spans 18 and that does not use polarization tracking devices at the receiver. At the transmitter side, the polarization multiplexing of the QPSK signals is realized in such a way that two sub-carrier components (one at a $\omega_-$ frequency and the other at $\omega_+$ frequency, downshifted and upshifted from the carrier frequency $\omega_c$, respectively) are generated along with the signal baseband. The $\omega_-$ sub-carrier is set in the vertical polarization whereas the $\omega_+$ sub-carrier is set in the horizontal polarization. An exemplary embodiment of such a polarization multiplexing modulator is illustrated in FIG. 6 (see QPSK Tx 94). From a practical viewpoint, it is desirable for all three cws (at the $\omega_+$, $\omega_-$, and $\omega_c$ frequencies) to be generated by a common laser source. This can be achieved by using an amplitude modulation of the $\omega_c$ wave, driven by a sinusoidal RF signal $(\omega_+-\omega_c)/2\pi$ frequency to generate the $\omega_+$, $\omega_-$ tones, followed by a filtering to separate $\omega_+$, $\omega_-$, and $\omega_c$ frequencies. Note that, unlike the setup in FIG. 3, the basebands in the vertical and horizontal polarizations are not split. Also, unlike the setup in FIG. 3, the $(\omega_+-\omega_-)/2\pi$ frequency separation is on the order of the signal bandwidth. The principle of operation of the receiver 92 illustrated in FIG. 6 (along with its setup) is similar to the principle of operation of the receiver illustrated in FIG. 3, and its setup, with the exception of heterodyne detection after the hybrid 60 instead of homodyne detection. In each QPSK V-pol. and QPSK H-pol. Receiver 96 and 98, the I and Q electrical signals are mixed with an RF LO at the intermediate frequency $f_{IF}=(\omega_+-\omega_c)/2\pi$ and RF filtered and processed by a decision circuit.

Figure 7:
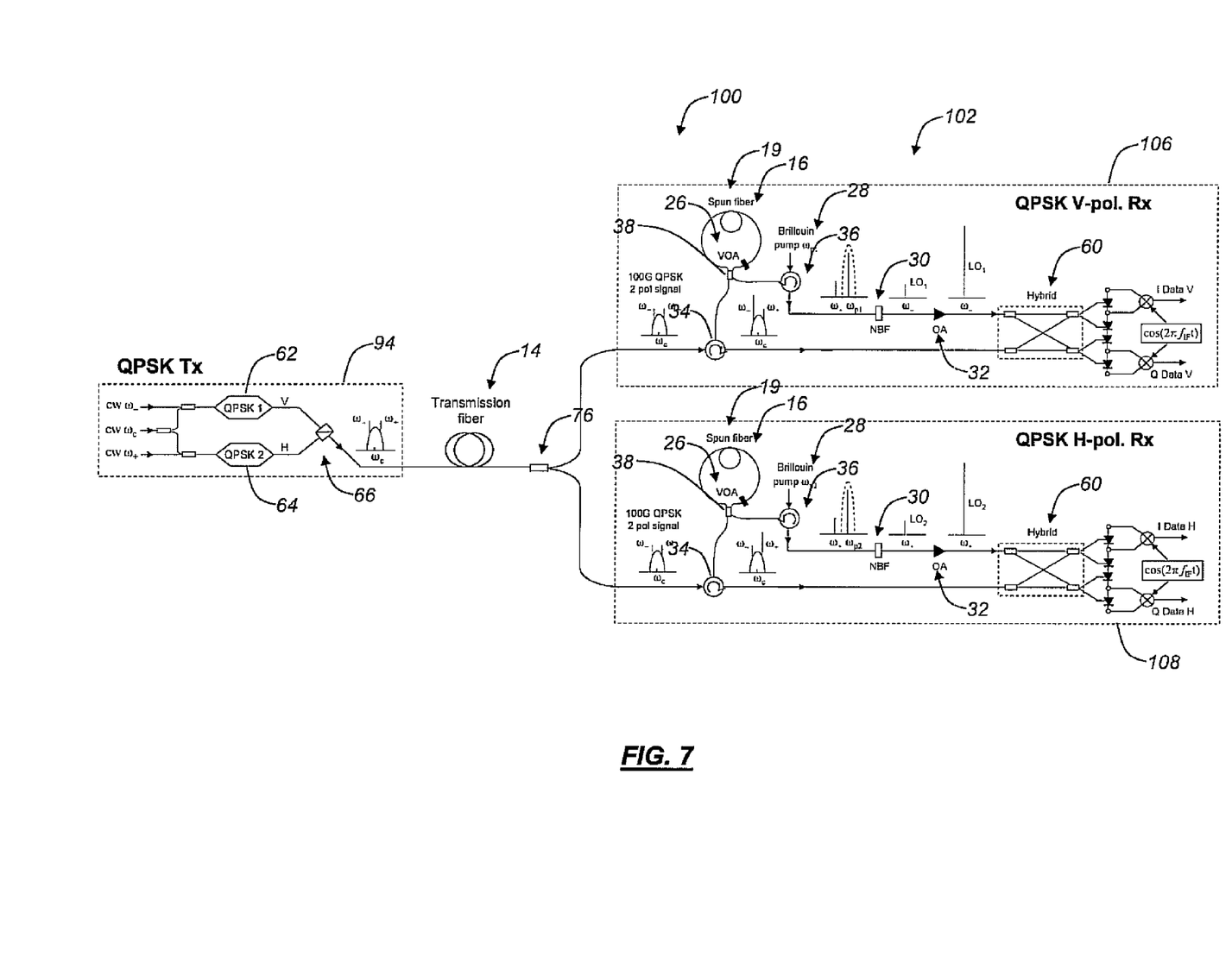
FIG. 7 is a schematic diagram illustrating one exemplary embodiment of a PDM QPSK fiber communication system that uses a polarization demultiplexing receiver based on one or more spun fiber spans and that does not use polarization tracking devices at the receiver.

FIG. 7 is a schematic diagram illustrating one exemplary embodiment of a PDM QPSK fiber communication system 100 that uses a polarization demultiplexing receiver 102 based on one or more spun fiber spans 19 and that does not use polarization tracking devices at the receiver 102. In this exemplary embodiment, a spun fiber 19 is used instead of the SMF span 18 (FIG. 6). The spun fiber 19 practically operates as a fully isotropic fiber, in which the state of polarization does not vary over distance, such that the state of polarization at the output of the spun fiber 19 remains identical to the input state of polarization. There is no time (i.e. environmental) variation of the reflectivity of the Sagnac loop mirror reflectivity and, consequently, there is no need for a PC 24 (FIG. 6) in the Sagnac loop 16 to adjust the time (i.e. environmental) loop reflectivity variations.

Figure 8:
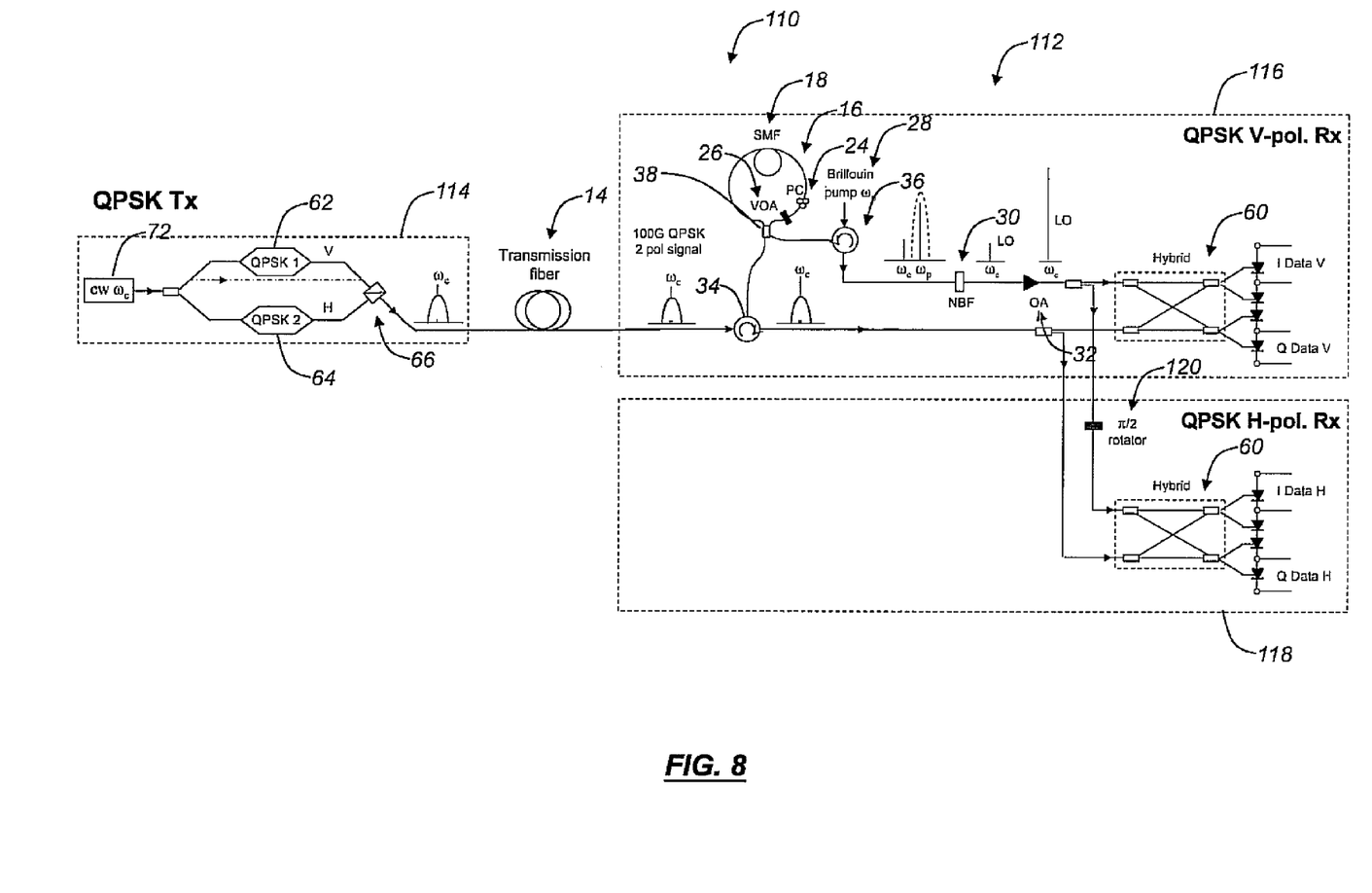
FIG. 8 is a schematic diagram illustrating another exemplary embodiment of a BFA assisted polarization demultiplexing coherent (homodyne) system and receiver that do not use polarization tracking devices.

FIG. 8 is a schematic diagram illustrating another exemplary embodiment of a BFA assisted polarization demultiplexing coherent (homodyne) system 110 and receiver 112 that does not use polarization tracking devices. In this embodiment, only one carrier in one of the two orthogonal polarizations is used for creating the VLO for both orthogonal polarizations. An exemplary embodiment of such transmitter is illustrated in the QPSK Tx block 114. A cw laser wave at a $\omega_c$ carrier frequency is split in two paths with a QPSK modulator 62 and 64 in each of the paths corresponding to the two PDM channels. These two paths are then combined by a polarization beam combiner 66 to create a PDM QPSK signal. A carrier component is set in the vertical polarization by tapping a small part of the $\omega_c$ wave is the vertical polarization path and sending it to the polarization combiner 66, bypassing the QPSK modulator 62. A key distinction between the present exemplary embodiment and all of the embodiments described above is at the receiver side, where only one BFA 28 is used. In this exemplary embodiment, the BFA assisted coherent detection for the vertically polarized channel works the same way as described above. For detecting the horizontally polarized channel, the same carrier wave is shared, but the state of polarization of the extracted carrier wave is transformed to its orthogonal polarization by using a $\pi/2$ rotator 120. This $\pi/2$-rotated carrier wave becomes co-polarized with the horizontal polarization channel. The conventional hybrid 60 is then used to demodulate the horizontally polarized channel. Although this embodiment has the clear advantage of having only one BFA loop instead of two BFA loops, the relative phase variations between the $\pi/2$-rotated carrier wave and the horizontally polarized signal can be much faster compared to the two BFA loop approaches. The reason for this is that, because of the birefringence resulting in a differential group delay (DGD) in the transmission fiber 14, the vertically and horizontally polarized channels travel different optical paths in the transmission fiber 14. Because of a random fluctuation of the DGD, the phase mismatch between two orthogonally polarized channels (and, hence, between the carrier wave and the horizontally polarized signal) can be fairly fast, approaching 1 MHz or even faster. In this case, additional measures have to be taken in the QPSK H-pol. hybrid 60 to stabilize the relative phase variations.

Figure 9:
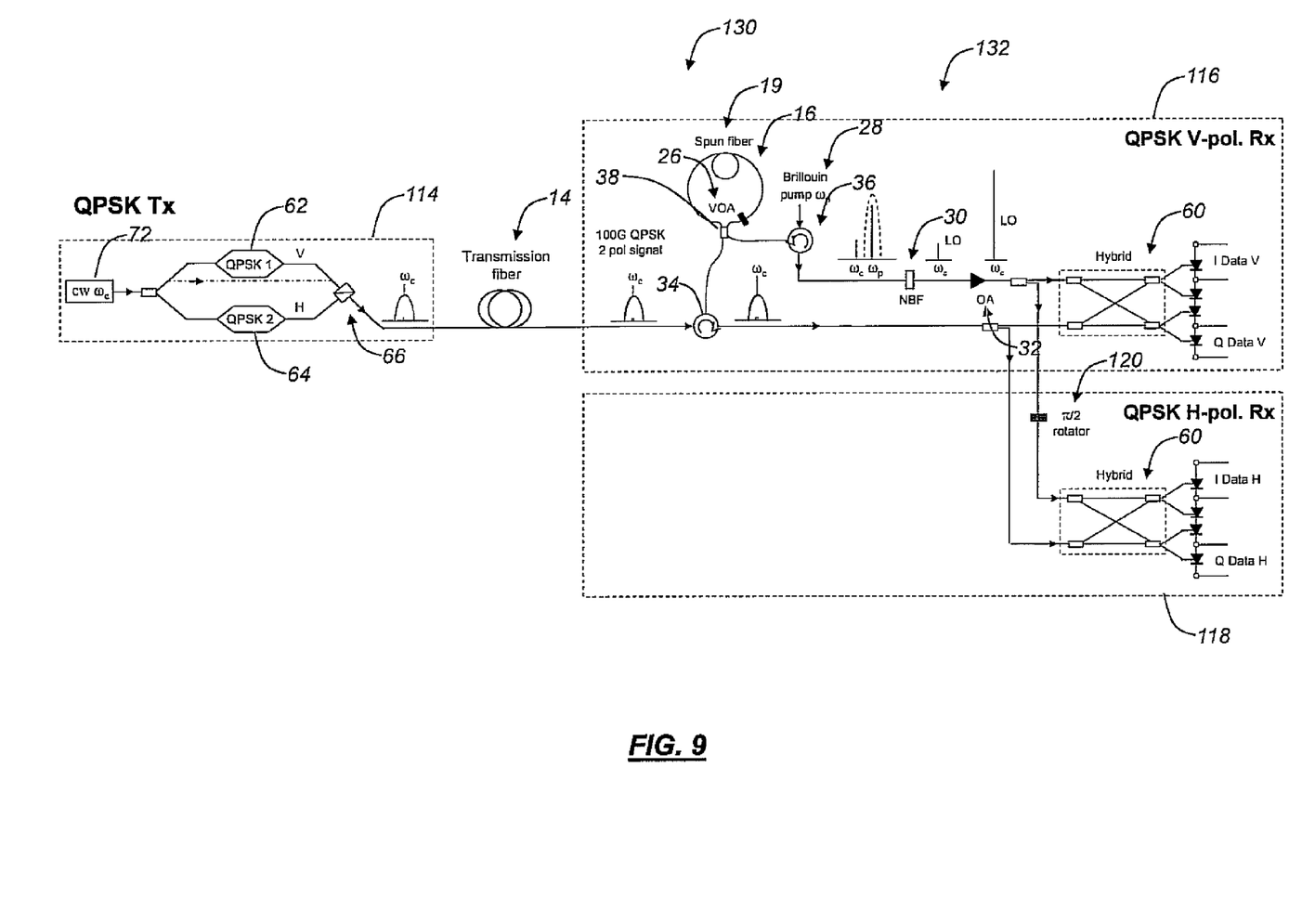
FIG. 9 is a schematic diagram illustrating a further exemplary embodiment of a BFA assisted polarization demultiplexing coherent (homodyne) system and receiver that do not use polarization tracking devices.

FIG. 9 is a schematic diagram illustrating a further exemplary embodiment of a BFA assisted polarization demultiplexing coherent (homodyne) system 130 and receiver 132 that do not use polarization tracking devices. In this exemplary embodiment, a spun fiber 19 is used instead of the SMF described above. The spun fiber 19 practically operates as a fully isotropic fiber, in which the state of polarization does not vary over distance such that the state of polarization at the output of the spun fiber 19 remains identical to the input state of polarization. Thus, there is no time (i.e. environmental) variation of the reflectivity of the Sagnac loop mirror reflectivity and, consequently, the PC 24 (FIG. 8) is not needed in the Sagnac loop 16 to adjust the time (i.e. environmental) Sagnac loop reflectivity variations.

In a still further exemplary embodiment of the BFA assisted polarization demultiplexing coherent receiver without polarization tracking devices, using only one BFA loop can be realized based on a heterodyne detection scheme. In this case, instead of the QPSK transmitter 114 in FIG. 8 or 9, a QPSK transmitter 94 similar to the one illustrated in FIG. 6 is used, in which only one (either $\omega_+$ or $\omega_-$) sub-carrier wave is present along with $\omega_c$, whereas the other sub-carrier wave (either $\omega_-$ or $\omega_+$) is turned off. At the receiver side, a heterodyne hybrid receiver 92 is used, similar to the one illustrated in FIG. 6, instead of the homodyne receiver 112 and 132 illustrated in FIGS. 8 and 9.

It should again be noted that some form of data line coding is required for this scheme, since signal content must still be separable from the LO by at least the width of Brilouin amplifier gain linewidth. This is on the order of few MHz. Such line coding is well known to those of ordinary skill in the art, and is used extensively in telephone systems, for example, in order to avoid severe electrical attenuation below 300 Hz.

Throughout the above descriptions, the QPSK signal modulation format is used solely for the purposes of illustration. All of the BFA assisted polarization demultiplexing coherent (homodyne and heterodyne) transmission systems without polarization tracking devices work equally well for the PDM signals using arbitrary M-ary PSK modulation formats. A proper M-ary PSK modulator at the transmitter and a proper M-ary PSK hybrid demodulator at the receiver should be used for each polarization instead of the QPSK modulator and the QPSK hybrid demodulator, respectively.

A unique advantage of the present invention relative to existing techniques is that the polarization demultiplexing of the PDM of arbitrary PSK signals is achieved without the use of any polarization tracking devices. Thus, the presented technique can be characterized as a self-polarization tracking technique. This means that the polarization demultiplexing of a polarization multiplexed PSK signal with the state of polarization varying over time with arbitrary speed can be performed equally well as for the case with no time variation of the state of polarization for the polarization multiplexed PSK signal. This advantage can be traded for a significant enhancement in the performance and efficiency of both digital and analog and optical communication systems. In particular, the present invention enables the implementation of PDM systems in fiber links with distributed high speed polarization scramblers. Such distributed high speed polarization scrambling is widely considered to be an efficient and the most economic technique for mitigating PMD in fiber communications. Combined with distributed high speed polarization scrambling, the PDM system becomes tolerant to PMD. In addition to that, because of the self-polarization tracking feature of the proposed technique, the crosstalk between the polarization channels at the receiver is significantly smaller compared to that using state of the art analog polarization tracking devices in which the polarization tracking error reaches 0.13 radians. The polarization division multiplexed transmission of optical signals with no polarization tracking at receiver is attractive for use in 100 Gb/s Ethernet and 40 Gb/s DPSK system, among others.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A system for the Brillouin fiber amplification based polarization insensitive coherent (homodyne) detection of a phase shift keying optical communication signal, comprising:
    a Sagnac loop comprising one of a single mode fiber span and a spun fiber span;
    a Brillouin pump coupled to the Sagnac loop;
    wherein the Sagnac loop and the Brillouin pump are collectively operable for amplifying a carrier component of the phase shift keying optical communication signal and separating the amplified carrier component of the phase shift keying optical communication signal from a baseband of the phase shift keying optical communication signal; and
    a phase shift keying hybrid coupled to the Sagnac loop and the Brillouin pump;
    wherein the Sagnac loop, the Brillouin pump, and the phase shift keying hybrid are collectively operable for extracting a local oscillator from the phase shift keying optical communication signal via the amplified carrier component of the phase shift keying optical communication signal to create a virtual local oscillator, and wherein the system is insensitive to the state of polarization of the phase shift keying optical communication signal.

2. The system of claim 1, wherein the Sagnac loop further comprises a variable optical attenuator operable for selectively attenuating the effect of the Brillouin pump on the phase shift keying optical communication signal.

3. The system of claim 1, wherein, when the Sagnac loop comprises the single mode fiber span, the Sagnac loop further comprises a polarization controller.

4. The system of claim 1, wherein the Sagnac loop is coupled to the Brillouin pump and the phase shift keying hybrid by one or more circulators.

5. The system of claim 1, further comprising a narrow band optical filter operable for attenuating the effect of the Brillouin pump disposed between the Sagnac loop and the phase shift keying hybrid.

6. The system of claim 1, further comprising an optical amplifier operable for amplifying the phase shift keying optical communication signal disposed between the Sagnac loop and the phase shift keying hybrid.

7. The system of claim 1, further comprising a phase shift keying detector coupled to the phase shift keying hybrid.

8. A method for the Brillouin fiber amplification based polarization insensitive coherent (homodyne) detection of a phase shift keying optical communication signal, comprising:
    providing a Sagnac loop comprising one of a single mode fiber span and a spun fiber span;
    providing a Brillouin pump coupled to the Sagnac loop;
    wherein the Sagnac loop and the Brillouin pump are collectively operable for amplifying a carrier component of the phase shift keying optical communication signal and separating the amplified carrier component of the phase shift keying optical communication signal from a baseband of the phase shift keying optical communication signal; and
    providing a phase shift keying hybrid coupled to the Sagnac loop and the Brillouin pump;
    wherein the Sagnac loop, the Brillouin pump, and the phase shift keying hybrid are collectively operable for extracting a local oscillator from the phase shift keying optical communication signal via the amplified carrier component of the phase shift keying optical communication signal to create a virtual local oscillator, and wherein the system is insensitive to the state of polarization of the phase shift keying optical communication signal.

9. The method of claim 8, wherein the Sagnac loop further comprises a variable optical attenuator operable for selectively attenuating the effect of the Brillouin pump on the phase shift keying optical communication signal.

10. The method of claim 8, wherein, when the Sagnac loop comprises the single mode fiber span, the Sagnac loop further comprises a polarization controller.

11. The method of claim 8, wherein the Sagnac loop is coupled to the Brillouin pump and the phase shift keying hybrid by one or more circulators.

12. The method of claim 8, further comprising providing a narrow band optical filter operable for attenuating the effect of the Brillouin pump disposed between the Sagnac loop and the phase shift keying hybrid.

13. The method of claim 8, further comprising providing an optical amplifier operable for amplifying the phase shift keying optical communication signal disposed between the Sagnac loop and the phase shift keying hybrid.

14. The method of claim 8, further comprising providing a phase shift keying detector coupled to the phase shift keying hybrid.

15. A fiber communication system incorporating a polarization demultiplexing receiver that does not require the use of a polarization tracking device at the polarization demultiplexing receiver, comprising:
    a transmitter; and
    a receiver component associated with a first polarization channel, comprising:
        a Sagnac loop comprising one of a single mode fiber span and a spun fiber;
        a Brillouin pump coupled to the Sagnac loop;
        wherein the Sagnac loop and the Brillouin pump are collectively operable for amplifying a carrier component of an optical communication signal and separating the amplified carrier component of the optical communication signal from a baseband of the optical communication signal; and
        a hybrid coupled to the Sagnac loop and the Brillouin pump;
        wherein the Sagnac loop, the Brillouin pump, and the hybrid are collectively operable for extracting a local oscillator from the optical communication signal via the amplified carrier component of the optical communication signal to create a virtual local oscillator.

16. The system of claim 15, wherein the transmitter comprises a carrier split polarization multiplexing transmitter.

17. The system of claim 16, wherein the transmitter further comprises one or more laser sources.

18. The system of claim 16, wherein the transmitter further comprises an acousto-optic frequency shifter.

19. The system of claim 16, wherein the transmitter further comprises a plurality of modulators.

20. The system of claim 16, wherein the transmitter further comprises a polarization combiner.

21. The system of claim 15, wherein the Sagnac loop further comprises a variable optical attenuator operable for selectively attenuating the effect of the Brillouin pump on the optical communication signal.

22. The system of claim 15, wherein, when the Sagnac loop comprises the single mode fiber span, the Sagnac loop further comprises a polarization controller.

23. The system of claim 15, wherein the Sagnac loop is coupled to the Brillouin pump and the hybrid by one or more circulators.

24. The system of claim 15, wherein the receiver component associated with the first polarization channel further comprises a narrow band optical filter operable for attenuating the effect of the Brillouin pump disposed between the Sagnac loop and the hybrid.

25. The system of claim 15, wherein the receiver component associated with the first polarization channel further comprises an optical amplifier operable for amplifying the optical communication signal disposed between the Sagnac loop and the hybrid.

26. The system of claim 15, further comprising a receiver component associated with a second polarization channel that is substantially similar to the receiver component associated with the first polarization channel.

27. The system of claim 26, further comprising a receiver component associated with a second polarization channel, wherein the receiver component associated with the second polarization channel comprises a polarization rotator and a hybrid.

28. The system of claim 5, wherein the system utilizes one of a homodyne detection scheme and a heterodyne detection scheme.

* * * * *